US006665914B2

(12) United States Patent
Ogawa

(10) Patent No.: US 6,665,914 B2
(45) Date of Patent: Dec. 23, 2003

(54) CLIP

(75) Inventor: Atsushi Ogawa, Utsunomiya (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/268,953

(22) Filed: Oct. 11, 2002

(65) Prior Publication Data

US 2003/0079316 A1 May 1, 2003

(30) Foreign Application Priority Data

Oct. 29, 2001 (JP) ....................................... 2001-330619

(51) Int. Cl.[7] ......................... A44B 21/00; F16B 21/00; F16B 19/10

(52) U.S. Cl. ............................. 24/297; 24/289; 24/291; 24/293; 24/295; 52/718.01; 411/508; 411/913

(58) Field of Search .......................... 24/297, 289, 293, 24/295, 291, 292; 52/718.01, 718.04, 718.02; 411/508, 913

(56) References Cited

U.S. PATENT DOCUMENTS 4,402,118 A 9/1983 Benedetti
4,544,612 A 10/1985 Ishii et al.
6,074,150 A 6/2000 Shinozaki et al.
6,119,316 A * 9/2000 Ishihara et al. ................ 24/297
6,141,837 A * 11/2000 Wisniewski .................. 24/293
6,353,981 B1 * 3/2002 Smith .......................... 24/295
6,497,011 B2 * 12/2002 Smith et al. .................. 24/295

FOREIGN PATENT DOCUMENTS

| | | |
|---|---|---|
| JP | 8-121441 | 5/1996 |
| JP | 10-54411 | 2/1998 |
| JP | 11-72108 | 3/1999 |
| JP | 11-287221 | 10/1999 |
| JP | 2000-249117 | 9/2000 |
| JP | 2001-271811 | 10/2001 |
| JP | 2001-330016 | 11/2001 |

* cited by examiner

*Primary Examiner*—Victor Sakran
(74) *Attorney, Agent, or Firm*—Kanesaka & Takeuchi

(57) ABSTRACT

A clip is attached to a member or center cluster for detachably attaching the member to an attaching member or instrument panel. The clip is provided with a pair of engaging members projecting with an inclination so that a distance therebetween is narrowed toward the inserting direction of a rib of the center cluster, and engaging portions of the engaging members engage an engagement hole of the rib.

8 Claims, 3 Drawing Sheets

6A 5A 5B 6B 11 13B (13A) (13a) 13b 13b (13a) 12b 21 1a 22 5a 1b 5b 12a 12 4A 4B 3A C 2A 3B 2B 1

CLIP

BACKGROUND OF THE INVENTION AND RELATED ART STATEMENT

The invention relates to a clip for detachably attaching, for example, a center cluster as a member to be attached to an instrument panel of an automobile as an attaching member.

As the clip described above, for example, Japanese Patent Publications (TOKKAI) No.10-54411 and No.2000-249117 disclose a clip attached to an attaching member for detachably attaching a member to be attached to the attaching member.

The clip disclosed in Japanese Patent Publications (TOKKAI) No.10-54411 and No.2000-249117 includes a pair of engaging members projecting with an inclination so that a space therebetween is gradually narrowed from an insertion terminating end side to an insertion start end side of a rib of a member to be attached, that is, toward the counter-insertion direction (an extracting direction) of the rib. Thus, the engaging portions of the engaging members are engaged with the engagement portion of the rib.

As described above, in the conventional clip, the pair of the engaging members is provided so that the space therebetween becomes narrow toward the extracting direction of the rib of the member to be attached. Thus, when a force for removing from the instrument panel (an attaching member) is applied to a center cluster (a member to be attached), the center cluster is easily detached from the clip, i.e. an instrument panel, because a holding force of the clip is weak.

Also, in a case that the clip together with the center cluster is removed from the instrument panel, since the center cluster is easily removed from the clip, the clip remains in the instrument panel. Since the clip has a small gripping portion, it is hard to remove the clip from the center cluster.

In view of the above problems, the present invention has been made and an object of the invention is to provide a clip, wherein a holding force is strengthened so that a member to be attached is hard to be removed from an attaching member and, at the same time, the member to be attached is removed from the attaching member together with the clip when the member to be attached is removed from the attaching member.

Further objects and advantages of the invention will be apparent from the following description of the invention.

SUMMARY OF THE INVENTION

A clip according to the present invention is detachably attached to an attaching member, and detachably attaches a member to be attached to the attaching member. The clip includes a pair of engaging members projecting with an inclination so that a space therebetween gradually is narrowed toward an insertion direction of a rib of the member to be attached, and engaging portions of the engaging members are engaged with an engagement portion of the inserted rib of the member to be attached. The clip also includes clipping members for clipping a leading end portion of the inserted rib.

It is preferable that the pair of the engaging members is positioned at an insertion start end of the rib and the engagement portion is an engagement hole, with which the engaging portions of the pair of the engaging members are engaged.

DETAILED DESCRIPTION OF PREFERRED EMBODIMENTS

Hereunder, embodiments of the present invention will be explained with reference to the accompanying drawings.

Figure 1:
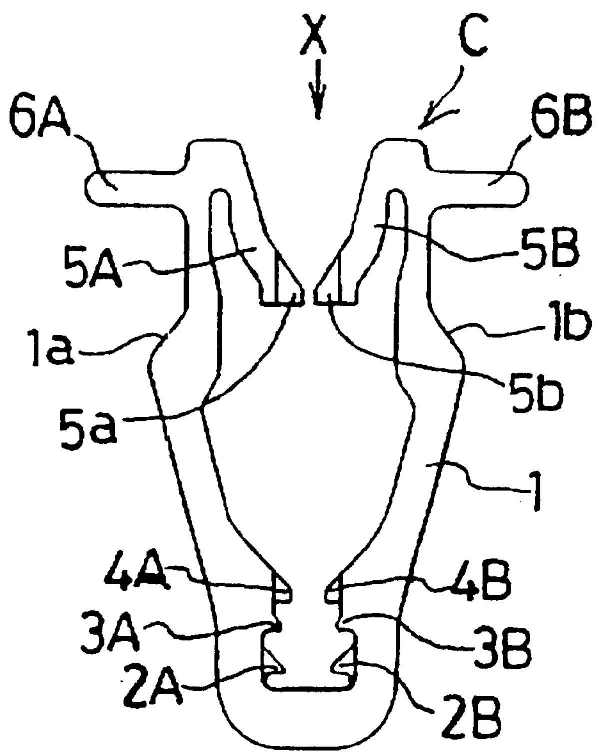
FIG. 1 is a front view of a clip of an embodiment according to the present invention.
Figure 2:
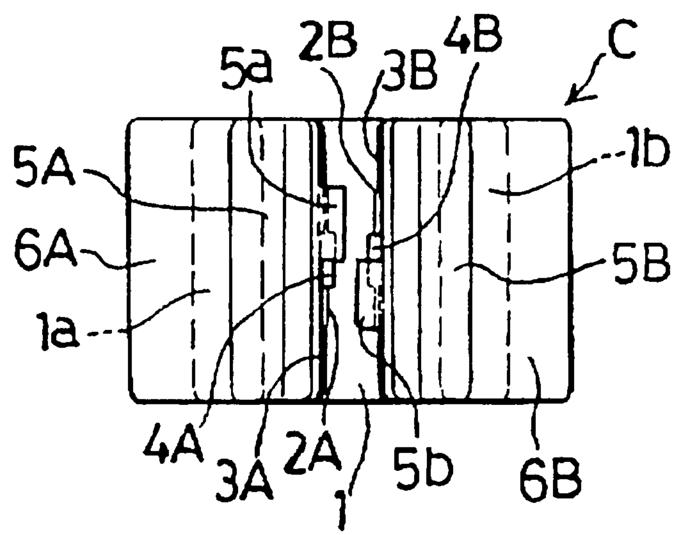
FIG. 2 is a plan view of the clip shown in FIG. 1.
Figure 3:
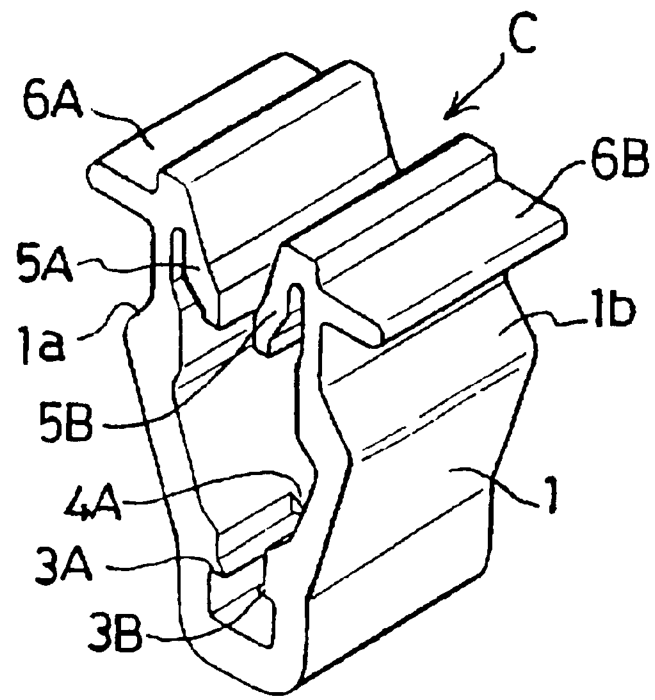
FIG. 3 is a perspective view of the clip shown in FIG. 1.
Figure 4:
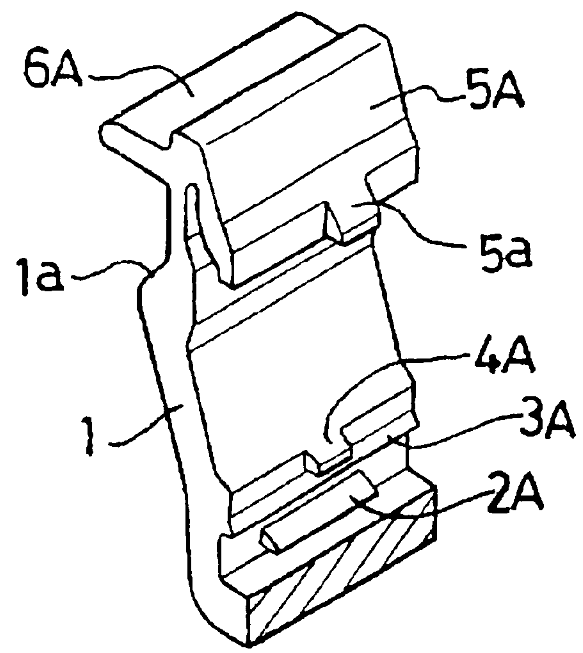
FIG. 4 is a perspective view showing a part cut in half of the clip in FIG. 1 in the same state as shown in FIG. 3.

FIG. 1 is a front view of a clip of an embodiment according to the invention; FIG. 2 is a plan view of the clip shown in FIG. 1; FIG. 3 is a perspective view of the clip shown in FIG. 1; and FIG. 4 is a perspective view showing a part cut in half of the clip in FIG. 1 in the same state as shown in FIG. 3.

In the drawings, a clip C made of a synthetic resin includes a clip main portion 1 having a U-shape, i.e. two side portions and a bottom portion; two pairs of clipping members 2A, 2B and 3A, 3B disposed inside the clip main portion 1 to face an insertion terminating portion (a lower end portion in FIG. 1) of a rib 12, described later, to hold the leading end portion of the rib 12 with tip portions from both sides; a pair of leading end engaging members 4A, 4B disposed inside the clip main portion 1 closer to an insertion start end side (an upper side in FIG. 1) of the rib 12 than the two pairs of clipping members 2A, 2B and 3A, 3B, to face each other so that the leading end engaging members 4A, 4B enter into leading end engagement hole 12*a* of the rib 12 from both sides; a pair of engaging members 5A, 5B disposed inside the clip main portion 1 to face the insertion start end of the rib 12, and projecting with an inclination so that a space therebetween is gradually narrowed toward an insertion direction X of the rib 12, and engaging portions 5*a*, 5*b* thereof engage an engaging hole 12*b* of the rib 12 from both sides; and a pair of flanges 6A, 6B disposed outside the clip main portion 1, and directed outward on both sides of the insertion starting end of the rib 12.

The clip C further includes a pair of engaging shoulder portions 1*a*, 1*b* provided outside an intermediate portion of the clip main portion 1 in the insertion direction X of the rib 12 so that the engaging shoulder portions 1*a*, 1*b* are pressed against edges of an attaching hole 22 provided to an instrument panel 21, described later.

Incidentally, the clipping members 2A, 2B, 3A, 3B, and the leading end engaging members 4A, 4B project with inclinations so that the spaces therebetween are narrowed in the inserting direction X of the rib 12.

As shown in FIG. 2, the pair of the engaging portions 5*a*, 5*b* is positioned in a staggered relation to enter deeply into the engagement hole 12*b* of the rib 12.

Figure 5:
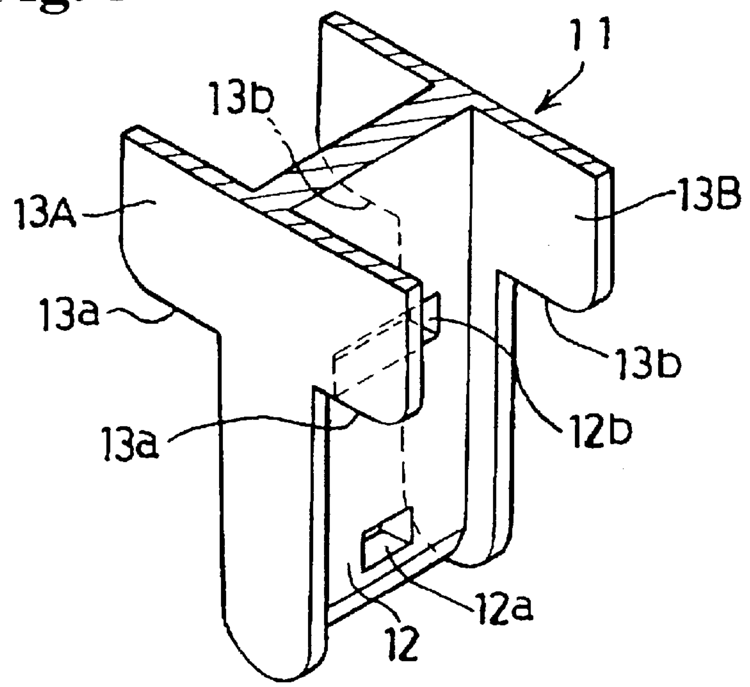
FIG. 5 is a perspective view showing a rib portion of a center cluster.

FIG. 5 is a perspective view showing a rib portion of a center cluster. In FIG. 5, a center cluster 11 as a member to be attached includes the rib 12 and flanges 13A, 13B integrally provided with the rib 12 along its longitudinal direction so as to hold the rib 12 therebetween. An end portion of the rib 12 is chamfered to facilitate insertion of the center cluster into the clip C.

The rib 12 includes a leading end engagement hole 12*a*, as a leading end engagement portion, positioned on a leading end portion thereof, and the pair of the leading end engaging members 4A, 4B enter therein. Also, the rib 12 includes the engagement hole 12*b*, as an engaging portion, positioned on a base end side, where the pair of the engaging portions 5*a* and 5*b* enters.

The flanges 13A, 13B are provided with clipping surfaces 13*a*, 13*b* to clip the instrument panel 21 together with the engaging shoulder portions 1*a*, 1*b* of the clip main portion 1.

Figure 6:
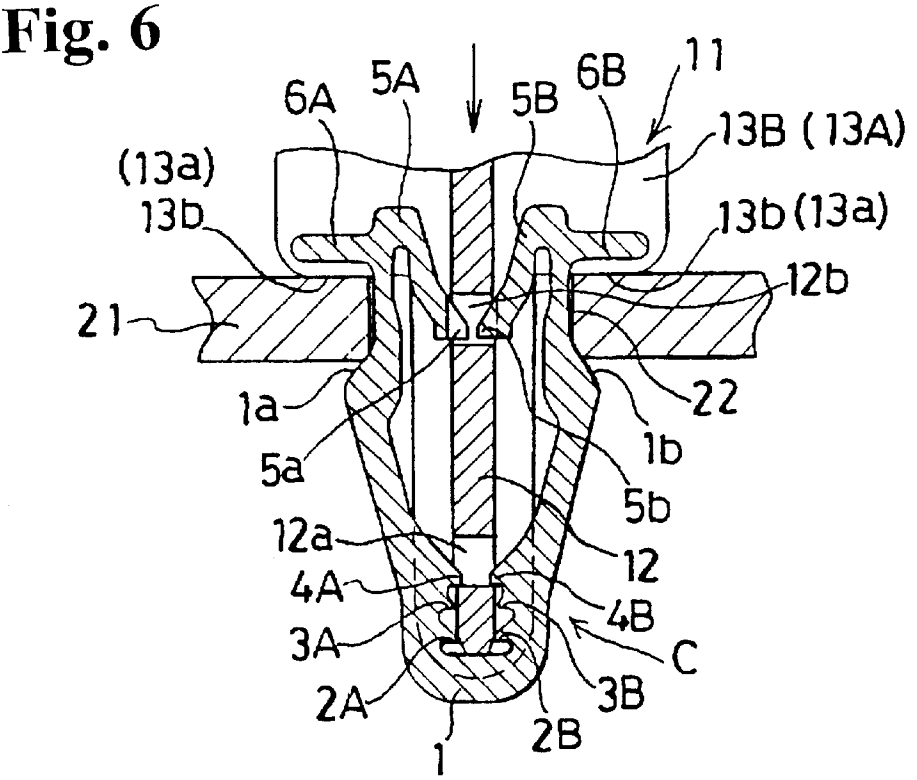
FIG. 6 is a sectional view in a state where the center cluster is attached to an instrument panel using the clip.

FIG. 6 is a sectional view showing a state where the center cluster is attached to the instrument panel with the clip. In FIG. 6, the instrument panel 21 as the attaching member is provided with a rectangular attaching hole 22 where the rib 12 attached to the clip C is inserted.

Next, an example of an attaching method of attaching the center cluster 11 to the instrument panel 21 will be explained. First, a flange 6A, 6B side of the clip C is positioned between the flanges 13A, 13B of the center cluster 11, and, at the same time, the rib 12 is positioned between the engaging members 5A, 5B. Then, the rib 12 is inserted between the engaging members 5A, 5B in the insertion X direction, as shown in FIG. 1.

When the rib 12 is inserted between the engaging members 5A, 5B, the leading end of the rib 12 is guided by the engaging members 5A, 5B to enter deeply in the clip main body 1 while widening a space between the engaging members 5A, 5B. Then, when the leading end portion of the rib 12 reaches between the leading end engaging members 4A, 4B, the leading end portion of the rib 12 is guided by the leading end engaging members 4A, 4B and further advances into the clip main portion 1 while opening a space between the leading end engaging members 4A, 4B. Thus, the both sides of the rib 12 guided by the clipping members 3A, 3B contact the clipping members 2A, 2B, respectively.

When the leading end portion of the rib 12 contacts the clipping members 2A, 2B, and, at the same time, the leading end engaging members 4A, 4B enter the leading end engagement hole 12*a* from both sides to engage therewith as shown in FIG. 6, the engaging portions 5*a*, 5*b* enter the engagement hole 12*b* from both sides of the rib 12 to engage therewith. When the leading end engaging members 4A, 4B enter the leading end engagement hole 12*a* from both sides and the engaging portions 5*a*, 5*b* enter the engagement hole 12*b* from both sides, the attachment of the clip C to the rib 12 is completed.

As described above, the clip C is inserted into the attaching hole 22 of the instrument panel 21 from the leading end side of the clip C, i.e. with the clipping members 2A, 2B downward, as shown in FIG. 6, with the clip C attached to the rib 12. When the clip C is inserted into the attaching hole 22, the clip main portion 1 passes through the attaching hole 22 while bending inward by its own elastic force. After the engaging shoulder portions 1*a*, 1*b* pass through the attaching hole 22, the clip main portion 1 expands outward by its own elastic force. Thus, the engaging shoulder portions 1*a*, 1*b* are pressed against a lower (back side) peripheral edge of the attaching hole 22 of the instrument panel 21 to engage therewith.

Then, under the state that the engaging shoulder portions 1*a*, 1*b* are engaged with the peripheral edge of the attaching hole 22, the clipping surfaces 13*a*, 13*b* of the flanges 13A, 13B are pressed against an upper side (a front side) of the instrument panel 21 by the elastic force with which the engaging shoulder portions 1*a*, 1*b* engage the peripheral edges of the attaching hole 22 through expansion of the clip main portion 1. Therefore, the instrument panel 21 is clipped by the engaging shoulder portions 1*a*, 1*b* and clipping surfaces 13*a*, 13*b*. Thus, the clip C is attached to the instrument panel 21 and, at the same time, the center cluster 11 is also attached to the instrument panel 21.

Next, a method of removing the center cluster 11 will be explained. In a case that the center cluster 11 needs to be removed for maintenance or the like, when the center cluster 11 is strongly pulled, the clip main portion 1 bends inwardly, so that the engagement between the engaging shoulder portions 1*a*, 1*b* and the peripheral edges of the attaching hole 22 is released. Thus, the clip C together with the center cluster 11 can be removed from the instrument panel 21. When the center cluster 11 is removed from the instrument panel 21 like this way, since the engaging members 5A, 5B are inclined in the direction where the engaging portions 5*a*, 5*b* enter the rib 12, the clip C is disengaged from the instrument panel 21 together with the center cluster 11 without separating therefrom.

As explained above, according to the embodiment of the invention, the pair of the inclined engaging members 5A, 5B is provided so that the space therebetween becomes narrow toward the inserting direction X of the rib 12 of the center cluster 11 and the engaging portions 5*a*, 5*b* engage the engagement hole 12*b* of the rib 12 from both sides thereof. Thus, when the center cluster 11 is removed from the instrument panel 21, the clip C together with the center cluster 11 can also be removed from the instrument panel 21.

Further, since the clipping members 2A, 2B; 3A, 3B for clipping the leading end portion of the inserted rib 12 from both sides are provided, the clipping members can hold the rib 12 not to wobble. Also, since the pair of the engaging members 5A, 5B is provided at the insertion start end of the rib 12, when the center cluster 11 is removed, the upper end portions, which project upward from the upper side (the front side) of the instrument panel 21, of the clip main portion 1 are opened in case that the engaging members 5A, 5B are pressed by the rib 12. In other words, the clip main portion 1 is easily bent. Thus, it is easy to remove the clip C and the center cluster 11 from the instrument panel 21.

Further, the engagement hole 12*b* is provided as an engagement portion, and the pair of the engaging portions 5*a*, 5*b* of the engaging members 5A, 5B is provided to be spaced apart from each other to engage the engagement hole 12*b*. Thus, the engaging portions 5*a*, 5*b* are engaged deeply with the engagement hole 12*b*, thereby increasing the engagement force between the clip C and the center cluster 11. Also, since there are provided the leading end engagement hole 12*a* of the rib 12 and the pair of leading end engaging members 4A, 4B to be engaged therewith from both sides, the engagement force between the clip C and the center cluster 11 is increased by the leading end engagement hole 12*a* and the pair of the leading end engaging members 4A, 4B.

In the above embodiment, the clip C is attached to the instrument panel 21 by holding the instrument panel 21 with the engaging shoulder portions 1*a*, 1*b* and the clipping surfaces 13*a*, 13*b*. However, the clip C may be attached to the instrument panel 21 by holding the engaging shoulder portions 1*a*, 1*b* and the flanges 6A, 6B.

As described above, in the structure where the instrument panel 21 is held by the engaging shoulder portions 1*a*, 1*b* and the flange portions 6A, 6B, the clip C may be attached first to the instrument panel 21 and, then, the rib 12 may be inserted into the clip C to attach the center cluster 11 to the clip C. With this method, the center cluster 11 can be attached to the instrument panel 21.

Although there has been explained an example wherein the center cluster 11 is used as a member to be attached and the instrument panel 21 is used as an attaching member, it is also possible that the present invention is applied to other combination such as a door lining member as a member to be attached and a door main portion as an attaching member.

As described above, according to the invention, there are provided the pair of the engaging members, which has the engaging portions engaging with the engagement portion of the rib and projecting with an inclination so that the space therebetween is narrowed toward the insertion direction of the rib to be inserted as the member to be attached. Therefore, in case that the member to be attached is removed from the attaching member, the clip together with the member to be attached can be removed from the attaching member. Also, since the clipping members for clipping the leading end portion of the inserted rib are provided, the rib can be held without wobbling.

Also, since the pair of the engaging members is positioned at the insertion start end of the rib, when the member to be attached is removed, the rib pushes the engaging members. Thus, the insertion start end side of the rib is widely opened, and the clip main portion of the clip is easily bent to thereby facilitate the removal of the clip and the member to be attached from the attaching member.

Further, since the engagement hole is provided as the engagement portion and the engaging portions of the pair of the engaging members are engaged with the engagement hole, the engaging portions are deeply engaged with the engagement hole to thereby increase the engaging force between the clip and the member to be attached.

While the invention has been explained with reference to the specific embodiments of the invention, the explanation is illustrative and the invention is limited only by the appended claims.

What is claimed is:

1. A clip for detachably attaching a first member with a rib and an engagement part to a second member with a hole, comprising:

a main body having two side portions for forming a space therebetween for receiving the rib, a bottom portion for connecting the two side portions, and an opening side opposite to the bottom portion, a pair of first engaging members attached inside the two side portions at the opening side and projecting inwardly with an inclination so that a distance therebetween is narrowed toward the bottom portion, said first engaging members having engaging portions to engage the engagement part of the rib, and first clipping members disposed inside the two side portions close to the bottom portion for immovably clipping a leading end portion of the rib therebetween.

2. A clip according to claim 1, wherein each of said first engaging members includes at a tip thereof a flat portion, said engaging portion projecting from the flat portion for engaging an engagement hole disposed in the rib as the engagement part.

3. A clip according to claim 2, wherein said engaging portions of the first engaging members are arranged to be laterally spaced apart from each other not to directly face each other.

4. A clip according to claim 3, further comprising a pair of second engaging members attached inside the two side portions between the first engaging members and the first clipping members to engage the rib.

5. A clip according to claim 4, further comprising a pair of flanges extending outwardly from the two side portions, and engaging shoulder portions integrally formed with the two side portions and projecting laterally outwardly from a center of the main body to be disposed under the flanges for receiving therebetween an edge of the second member.

6. A clip according to claim 5, wherein said two side portions have inclined inner surfaces and parallel surfaces between the inner surfaces and the bottom portion, said first clipping members and said second engaging members being located on the parallel surfaces to immovably hold the rib in the clip between upper and lower sides in the clip.

7. A clip according to claim 4, further comprising a pair of second clipping members situated between the first clipping members and the second engaging members.

8. A clip according to claim 5, wherein said engaging shoulder portions and the engaging portions are located substantially in a same horizontal plane.

* * * * *